US012574227B2

(12) United States Patent
Serguieva et al.

(10) Patent No.: US 12,574,227 B2
(45) Date of Patent: Mar. 10, 2026

(54) BIO-LOCKED SEED

(71) Applicant: nChain Licensing AG, Zug (CH)

(72) Inventors: Antoaneta Serguieva, London (GB);
Craig Steven Wright, London (GB)

(73) Assignee: nChain Licensing AG, Zug (CH)

( * ) Notice: Subject to any disclaimer, the term of this
patent is extended or adjusted under 35
U.S.C. 154(b) by 377 days.

(21) Appl. No.: 18/022,738

(22) PCT Filed: Jul. 26, 2021

(86) PCT No.: PCT/EP2021/070794
§ 371 (c)(1),
(2) Date: Feb. 22, 2023

(87) PCT Pub. No.: WO2022/042970
PCT Pub. Date: Mar. 3, 2022

(65) Prior Publication Data
US 2023/0224150 A1 Jul. 13, 2023

(30) Foreign Application Priority Data

Aug. 24, 2020 (GB) ..................................... 2013173

(51) Int. Cl.
*H04L 9/08* (2006.01)
*H04L 9/32* (2006.01)
(52) U.S. Cl.
CPC .......... *H04L 9/0866* (2013.01); *H04L 9/3231* (2013.01)
(58) Field of Classification Search
None
See application file for complete search history.

(56) References Cited

U.S. PATENT DOCUMENTS 6,363,485 B1 3/2002 Adams et al.
10,396,985 B1 8/2019 Nagelberg et al.
(Continued)

FOREIGN PATENT DOCUMENTS

CN 105812126 A 7/2016
CN 109658078 A 4/2019
(Continued)

OTHER PUBLICATIONS

Combined Search and Examination Report for Great Britain Application No. 2013172.8, dated Jan. 7, 2021, 6 pages.
(Continued)

*Primary Examiner* — Jeffrey C Pwu
*Assistant Examiner* — Mayasa A. Shaawat
(74) *Attorney, Agent, or Firm* — Galvani Smith PLLC

(57) ABSTRACT

A computer-implemented method of storing a biometric vault system on a blockchain, wherein the biometric vault system comprises one or more biometric vaults, each biometric vault locking a respective secret value, and wherein the method comprises: obtaining at least one biometric reading; identifying a plurality of biometric features from the at least one biometric reading; generating one or more first biometric vaults; generating one or more blockchain transactions, wherein each blockchain transaction comprises a respective output comprising at least part of a respective second biometric vault, wherein each second biometric vault comprises a respective first biometric vault; and transmitting the one or more blockchain transactions to the blockchain network.

20 Claims, 11 Drawing Sheets

(56) References Cited

U.S. PATENT DOCUMENTS

| | | | |
|---|---|---|---|
| 2009/0310779 | A1 | 12/2009 | Lam et al. |
| 2011/0258460 | A1* | 10/2011 | Pizano ................... G06F 21/32 |
| | | | 713/189 |
| 2015/0095654 | A1 | 4/2015 | Li et al. |
| 2017/0300739 | A1 | 10/2017 | Suwald et al. |
| 2019/0130082 | A1 | 5/2019 | Alameh et al. |
| 2019/0163890 | A1 | 5/2019 | Cho et al. |
| 2019/0280864 | A1 | 9/2019 | Cheng et al. |
| 2019/0356491 | A1* | 11/2019 | Herder, III ............ H04L 9/3242 |
| 2020/0259638 | A1 | 8/2020 | Carmignani et al. |
| 2021/0326490 | A1 | 10/2021 | Zalivaka et al. |
| 2021/0398134 | A1 | 12/2021 | Dumas et al. |
| 2025/0132905 | A1 | 4/2025 | Osborn et al. |

FOREIGN PATENT DOCUMENTS

| | | |
|---|---|---|
| JP | 2001144743 A | 5/2001 |
| JP | 2001168854 A | 6/2001 |
| JP | 2009026235 A | 2/2009 |
| JP | 2010176370 A | 8/2010 |
| JP | 2013027011 A | 2/2013 |
| WO | 2007113888 A1 | 10/2007 |

OTHER PUBLICATIONS

Combined Search and Examination Report under Sections 17 and 18(3) for Application No. GB2013173.6, mailed on May 26, 2021, 10 pages.

Dewar M., et al., "Ordering Block Designs: Gray Codes, Universal Cycles and Configuration Orderings," CMS Books in Mathematics, Springer, 2012, 219 pages.

D'Cent, "The Most Advances Cryptocurrency Hardware Wallet," D'Cent Wallet, IoTrust, retrieved from the Internet: URL: https://dcentwallet.com/products/BiometricWallet, Mar. 9, 2020, 8 pages.

Hirschbichler M., et al., "A Multiple-Control Fuzzy Vault," Sixth Annual Conference on Privacy, Security and Trust, 2008, pp. 36-47.

International Search Report and Written Opinion for International Application No. PCT/EP2021/070794, mailed on Oct. 29, 2021, 14 pages.

International Search report and Written Opinion issued in International Application No. PCT/EP2021/070790, mailed on Oct. 26, 2021, 14 pages.

Jin Z., et al., "Fingerprint Template Protection with Minutiae-Based Bit-String for Security and Privacy Preserving," Expert Systems with Applications, May 2012, vol. 39 (6), pp. 6157-6167.

Kho J.B., et al., "Cancelable Fingerprint Template Design with Randomized Non-Negative Least Squares," Pattern Recognition, Jul. 2019, vol. 91, pp. 245-260.

Li C., et al., "A Security-Enhanced Alignment-Free Fuzzy Vault-Based Fingerprint Cryptosystem Using Pair-Polar Minutiae Structures," IEEE Transactions on Information Forensics and Security, Mar. 2016, vol. 11, No. 3, pp. 543-555.

Lin S., et al., "Error Control Coding: Fundamentals and Applications," Prentice-Hall Computer Applications in Electrical Engineering Series, 2nd edition, 2005, 624 pages.

Liu F., et al., "Fingerprint Pore Matching Using Deep Features," Pattern Recognition, Jun. 2020, vol. 102, 7 pages.

Moon T.K., "Error Correction Coding: Mathematical Methods and Algorithms," Wiley Interscience, 2005, 39 pages.

Murakami T., et al., "Optimal Sequential Fusion for Multibiometric Cryptosystems," Information Fusion, Feb. 2016, vol. 32, 51 pages.

Palatinus M., et al., "BIP 39: Mnemonic Code For Generating Deterministic Keys," Github Bitcoin BIPs, Sep. 10, 2013, 4 pages.

Ratha N. K., "Generating Cancelable Fingerprint Templates," IEEE Transactions on Pattern Analysis and Machine Intelligence, 2007, vol. 29, No. 4, pp. 561-572.

Sarier N. D., et al., "Privacy Preserving Biometric Identification on the Bitcoin Blockchain," International Conference on Image Analysis and Processing, 2018, pp. 254-269.

Shi S., et al., "Fingerprint Recognition Strategies Based on a Fuzzy Commitment for Cloud-Assisted IoT: A Minutiae-Based Sector Coding Approach," IEEE Access, Mar. 19, 2019, vol. 7, pp. 44803-44812.

Tams B., et al., "Security Considerations in Minutiae-Based Fuzzy Vaults," IEEE Transactions on Information Forensics and Security, May 2015, vol. 10 (5), 3 pages.

Thakkar D., "Minutiae Based Extraction in Fingerprint Recognition," Biometric Terminology Rubrics, Biometric Solutions, Oct. 21, 2016, retrieved from the Internet: https://www.bayometric.com/minutiae-based-extraction-fingerprint-recognition/, on Aug. 24, 2020, 7 pages.

Trezor, "Hierarchical Deterministic Wallet," Trezor Wiki rubrics, retrieved from the Internet: URL: https://trezor.io/learn/a/what-is-a-hardware-wallet, on Aug. 24, 2020, 2 pages.

US National Forensic Science Technology Center (NFSTC), "A Simplified Guide To Crime Scene Investigation," NFSTC, 2013, 20 pages.

U.S. National Institute of Standards and Technology, "Minutiae Interoperability Exchange (MINEX) III," NIST, Jun. 2020, retrieved from the Internet: https://www.nist.gov/itl/iad/image-group/minutiae-interoperability-exchange-minex-iii, on Aug. 24, 2020, 3 pages.

U.S. National Institute of Standards and Technology, "Proprietary Fingerprint Template III," Test Plan and Application Programming Interface, updated on Dec. 2019, 20 pages.

Voegtlin T., "Electrum Documentation," Release 3.3, Aug. 15, 2022, GUI and beginners, 93 pages.

Wong W.J., et al., "A Security- and Privacy-Driven Hybrid Biometric Template Protection Technique," International Conference on Electronics, Information and Communications (ICEIC), IEEE, Jan. 15, 2014, 5 pages.

Wuille P., "BIP 32: Hierarchical Deterministic Wallets," Github Bitcoin BIPs, Feb. 2012, 6 pages, Retrieved from the Internet: URL: https://en.bitcoin.it/wiki/BIP_0032, Retrieved on Aug. 24, 2020.

Yau W., "Fingerprint Templates," in Li S., and Jain A K., Encyclopedia of Biometrics, vol. 1, Springer, 2009, 1466 pages.

Antonopoulos, A. M., Bitcoin and Blockchain, First Edition, NTT Publishing Co., Ltd., Jul. 21, 2016, pp. 95-102.

Shibata Y., et al., "Key Generation from Multiple Biometric Features Using Statistical A/D Conversion with Error Correction", Information Processing Society of Japan Journal, Japan, Information Processing Society of Japan, Sep. 15, 2007, vol. 48, No. 9, pp. 3027-3038.

Hangai S., "A Textbook of Biometrics First Edition," Corona Publishing Co Ltd, Jul. 6, 2012, pp. 74-77.

Zhao H., et al., "Lightweight Backup and Efficient Recovery Scheme for Health Blockchain Keys," 2017 IEEE 13th International Symposium on Autonomous Decentralized Systems, 2017, pp. 229-234.

* cited by examiner

Transaction
from Alice to Bob

Validated by running: Locking
script from output 203 of $Tx_0$,
together with Alice's unlocking
script from input 202 of $Tx_1$. This
checks that Alice's unlocking script
in $Tx_1$ meets the condition(s)
defined in the locking script of
previous transaction $Tx_0$.

Figure 4
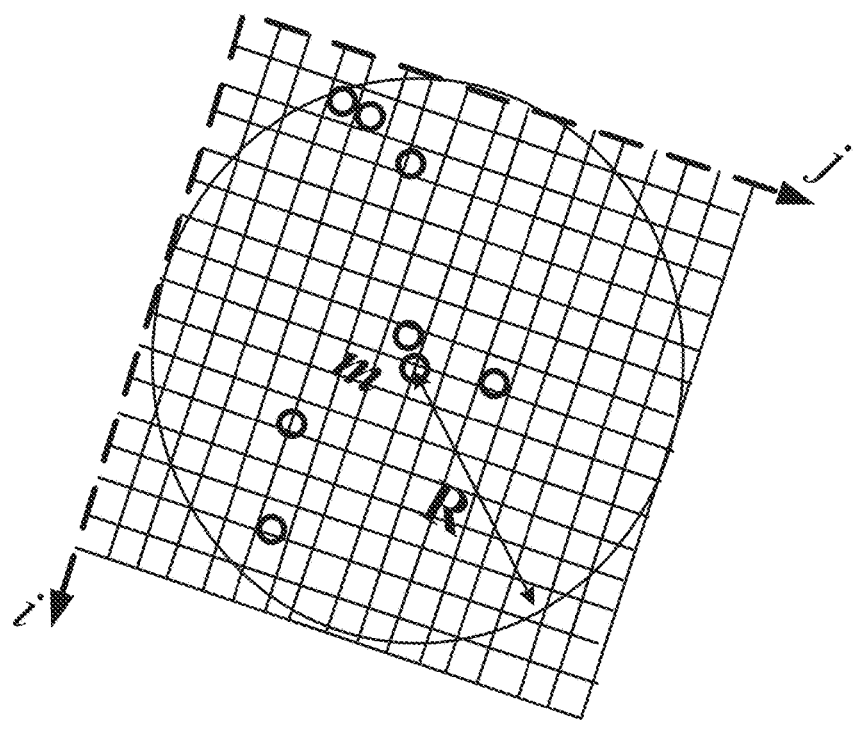
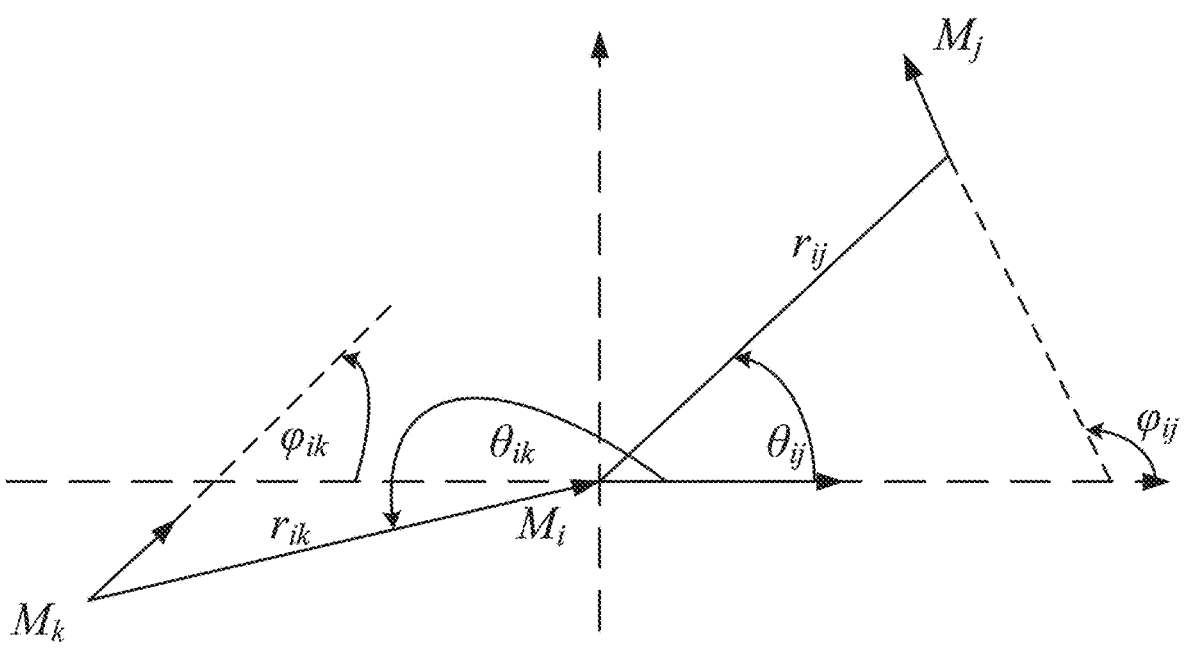

Figure 9

| TxID$_i$ | | | | |
|---|---|---|---|---|
| Inputs | | Outputs | | |
| Value | Script | index | Value | Script |
| $Z_i$ BSV | $< SIG_{Alice}^{reg\_vault_i} >$ $< PK_{Alice}^{reg\_vault_i} >$ | 0 | $z_i < Z_i$ BSV | *UTXO Revocation:*<br>OP_DUP HASH160<br>$< PK_{Alice}^{rev\_vault_i} >$<br>OP_EQUALVERIFY<br><br>OP_CHECKSIG |
| | | 1 | 0 BSV | *Vault:*<br>OP_FALSE OP_RETURN<br>OP_PUSHDATA<br>$< \quad Encrypted \; Vault_{i,sk} >$ |

Figure 10

| TxID$_{i,n_i}$ | | | | |
|---|---|---|---|---|
| Inputs | | Outputs | | |
| Value | Script | index | Value | Script |
| $Z_{n_i}$ BSV | $< SIG^{reg\_vault_{i,n_i}} >$ $< PK^{reg\_vault_{i,n_i}} >$ | 0 | $z_{i,n_i}$ BSV | *UTXO Revocation:*<br>OP_DUP HASH160 $< PK^{rev\_vault\_slice_{i,n_i}} >$<br>OP_EQUALVERIFY OP_CHECKSIG |
| | | 1 | $change_{i,n_i}$ BSV | *UTXO change:*<br>OP_DUP HASH160 $< PK_{change}^{vault\_slice_{i,n_i}} >$<br>OP_EQUALVERIFY OP_CHECKSIG |
| | | 2 | 0 BSV | *Vault:*<br>OP_FALSE OP_RETURN<br>OP_PUSHDATA<br>$< \quad Encrypted \; vault\_slice_{i,n_i} >$... |

Figure 11

| TxID$_i$ | | | | |
|---|---|---|---|---|
| Inputs | | Outputs | | |
| Value | Script | index | Value | Script |
| $Z_i$ BSV | $< SIG_{Alice}^{reg\_vault_i} >$<br><br>$< PK_{Carl}^{reg\_vault_i} >$ | 0 | $z_i < Z_i$ BSV | *UTXO Revocation:*<br>OP_DUP HASH160<br>$< PK_{Carl}^{rev\_vault_i} >$<br>OP_EQUALVERIFY<br><br>OP_CHECKSIG |
| | | 1 | 0 BSV | *Vault:*<br>OP_FALSE OP_RETURN<br>OP_PUSHDATA<br>$< \quad Encrypted \ Vault_{i,sk} >$ |

Figure 12

| TxID$_{i,n_i}$ | | | | |
|---|---|---|---|---|
| Inputs | | Outputs | | |
| Value | Script | index | Value | Script |
| $Z_{n_i}$ BSV | $<$<br>$SIG^{reg\_vault_{i,n_i}}$<br>$>$<br>$<$<br>$PK^{reg\_vault_{i,n_i}}$<br>$>$ | 0 | $z_{i,n_i}$ BSV | *UTXO Revocation:*<br>OP_DUP HASH160 $< PK^{rev\_vault\_slice_{i,n_i}} >$<br>OP_EQUALVERIFY OP_CHECKSIG |
| | | 1 | $change_{i,n_i}$ BSV | *UTXO change:*<br>OP_DUP HASH160 $< PK_{change}^{vault\_slice_{i,n_i}} >$<br>OP_EQUALVERIFY OP_CHECKSIG |
| | | 2 | 0 BSV | *Vault:*<br>OP_FALSE OP_RETURN<br>OP_PUSHDATA<br>$< \quad Encrypted \ vault\_slice_{i,n_i} >...$ |

103a

Live biometric reading

Generate 1st
Biometric Vaults

Generate 2nd
Biometric Vaults

Generate
Transactions

Record
Transactions on-
Chain

Alice's vault system recorded
on-chain

BIO-LOCKED SEED

CROSS REFERENCE TO RELATED APPLICATIONS

This application is the U.S. National Stage of International Application No. PCT/EP2021/070794 filed on Jul. 26, 2021, which claims the benefit of United Kingdom Patent Application No. 2013173.6, filed on Aug. 24, 2020, the contents of which are incorporated herein by reference in their entireties.

TECHNICAL FIELD

The present disclosure relates to a method of storing a biometric vault system on a blockchain.

BACKGROUND

Public-key cryptography is a type of cryptographic system that uses pairs of keys: private keys which are known only to the owner of the private key, and public keys which are generated based on the corresponding private key and which may be disseminated without compromising the security of the private key. Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature on the message. Anyone with the signer's corresponding public key can use the same message and the digital signature on the message to verify whether the signature was validly created, i.e. whether the signature was indeed made using the signer's private key.

A private key is normally generated using a "seed". A seed refers to secret data that is known to only to the owner(s) of the private keys that are to be generated by that seed. One or more private keys are generated as a function of the seed. For instance, a hash function may be applied to the seed to generate a private key, sometimes referred to as a "master private key". As well as generating private keys for the first time, the same seed can be used to re-generate, i.e. reconstruct, those same private keys. For instance, if a user loses their private key(s), those private keys can be reconstructed so long as the seed is still known to the user.

One particular field that makes use of public-key cryptography is blockchain technology. As well as encrypting messages (e.g. data stored in a transaction output), public keys are also used to "lock", or assign, an output to an owner of a private key corresponding to a given public key. In that case, only the owner of the private key can "unlock" the output. Further details on the use of public-key cryptography in the context of the blockchain are provided below.

SUMMARY

One common standard for managing private keys for use on the blockchain is hierarchical deterministic (HD) key management. For example, in Bitcoin Improvement Proposal (BIP) 32, a hierarchical key tree is derived from a single source of entropy using a deterministic public algorithm. The first step in the algorithm is generating the seed.

The seed is generated as a random bit-sequence (recommended 256 bits) from a pseudo-random number generator (PRNG). HD key management efficiently resolves the bag-of-keys problem. The remaining challenge is that the user has to remember and/or write down and keep safe the seed, and communicate it when the private keys (sometimes referred to as a "wallet", i.e. a wallet of keys) has to be reconstructed or shared. Humans are predisposed to failing in these tasks when the seed is a raw bit-sequence.

That challenge was addressed in BIP39. A system was proposed for abstracting into a mnemonic phrase the entropy required for the master key. A mnemonic phrase is easier to manipulate, and is more user-friendly than the raw seed. A remaining challenge is that security and usability are conflicting objectives. Wallet security increases with increasing seed entropy. This, in turn, increases the number of random words in the mnemonic phrase to the extent that it is increasingly difficult or infeasible to memorize. Balancing this challenge, BIP39 indicated an "allowed size of entropy" in the range of 128-256 bits and suggested a dictionary of $2^{11}$ words. That provided for a phrase length of up to 24 words.

Therefore, the remaining challenge consists of simultaneously achieving the following. On the one hand, generating a seed that is not necessary to memorise and is user-friendly to reproduce. On the other hand, generating a seed without restrictions on the size of entropy.

It would therefore be desirable to overcome either challenge, or even more desirable to achieve the dual objective of overcoming both challenges at the same time. Similar considerations may apply to other types of hierarchal domain wallets, or more generally any scheme for generating a seed from which keys are derived.

According to one aspect disclosed herein, there is provided a computer-implemented method of storing a biometric vault system on a blockchain, wherein the biometric vault system comprises one or more biometric vaults, each biometric vault locking a respective secret value, and wherein the method comprises: obtaining at least one biometric reading; identifying a plurality of biometric features from the at least one biometric reading; generating one or more first biometric vaults, wherein each first biometric vault corresponds to a respective target one of the plurality of biometric features and comprises a respective plurality of binary data pairs, each data pair comprising a first binary value and a second binary value, wherein at least some of the first binary values are respective first binary representations of the target biometric feature relative to respective other ones of the identified biometric features, and wherein at least a first threshold number of the second binary values that are paired to the respective first binary representations are required to reconstruct a respective first-level secret value; generating one or more blockchain transactions, wherein each blockchain transaction comprises a respective output comprising at least part of a respective second biometric vault, wherein each second biometric vault comprises a respective first biometric vault; and transmitting the one or more blockchain transactions to the blockchain network.

According to another aspect disclosed herein, there is provided a computer-implemented method of unlocking one or more biometric vaults of a biometric vault system, and wherein the method comprises: obtaining at least one candidate biometric reading; identifying a plurality of biometric features from the at least one biometric reading; generating a plurality of respective candidate binary representations of respective ones of the plurality of biometric features; obtaining, from the blockchain, one or more second biometric vaults, each second biometric vault comprising a respective first biometric vault, and wherein each first biometric vault comprises a plurality of respective first binary values paired with a respective second binary value; and for each first biometric vault: determining at least a threshold number of respective first binary values that correspond to respective ones of the plurality of candidate binary representations, obtaining a threshold number of the second binary values that are paired with respective ones of a first threshold number of first binary representations, and reconstructing a first-level secret value based on each of the first threshold number of the second binary values.

The biometric vault system locks one or more secret values (referred to below as "seeds", but this is not limiting). A different first-level secret value is "locked" in a separate vault of the system. Each vault contains first binary values linked to second binary values. Some of the first binary values are respective binary representations generated based on the user's biometric features. In some examples, some of the first binary values are binary representations of mock (i.e. fake) biometric features linked with mock second binary values. A threshold number of "real" second binary values are required in order to reconstruct a first-level secret value locked by a given vault. Each vault may be stored in an output of a different blockchain transaction that is recorded on the blockchain, or in some examples a vault may be split into vault slices, with each slice stored in a different blockchain transaction.

When a user needs to recover their seed, the user provides another (live) biometric reading or readings, if required. The vaults are obtained from the blockchain transactions. When the user provides their reading(s), a set of candidate biometric representations are generated based on the user's biometric features. Using those candidate biometric representations, the first biometric representations matching the candidate ones are identified in each biometric vault, and the second binary values mapped to those first biometric representations are obtained. If a threshold number of first biometric representations are identified, and thus a threshold number of second binary values are obtained, then a first-level secret value (e.g. a seed) can be reconstructed. If the vault system locks a second secret value, or a "second-level" secret value, then the above process may be performed for a threshold number of vaults. If a threshold number of first-level secret values are obtained they can be used to reconstruct the second-level secret value (e.g. a seed).

The first-level and/or second-level secret values may be used to derive respective sets of private keys, e.g. hierarchical deterministic key structures.

A bio-locked seed (or more generally, a bio-locked secret) may in some examples provide access to reproducible entropy of unrestricted size. This is achieved by a system of bio-vaults, where revocable on-chain bio-vaults are distributed (e.g. randomly) among outputs of blockchain transactions. Each vault locks a different secret value, and in turn those secret values may be used as a random partial clue towards constructing or reconstructing another seed of arbitrary size. Each secret value (or "clue") can be unlocked only by the intended user.

This approach is not dependent on error correction decoding, and the dependence on the accuracy of minutiae recognition techniques can be reduced or eliminated by introducing redundancies in the vault system. The redundancies in the system also reduce or eliminate dependence on accidents of physically losing some minutia features. Furthermore, a shared wallet can be created if a vault system unlocking the same high-entropy seed includes bio-vaults where some vaults are based on bio-features of one user, and other vaults in the same system are based on bio-features of another user.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 4 illustrates minutia position in relation to other minutiae and irrelevant to a central reference frame.

DETAILED DESCRIPTION OF EMBODIMENTS

Example System Overview

Figure 1:
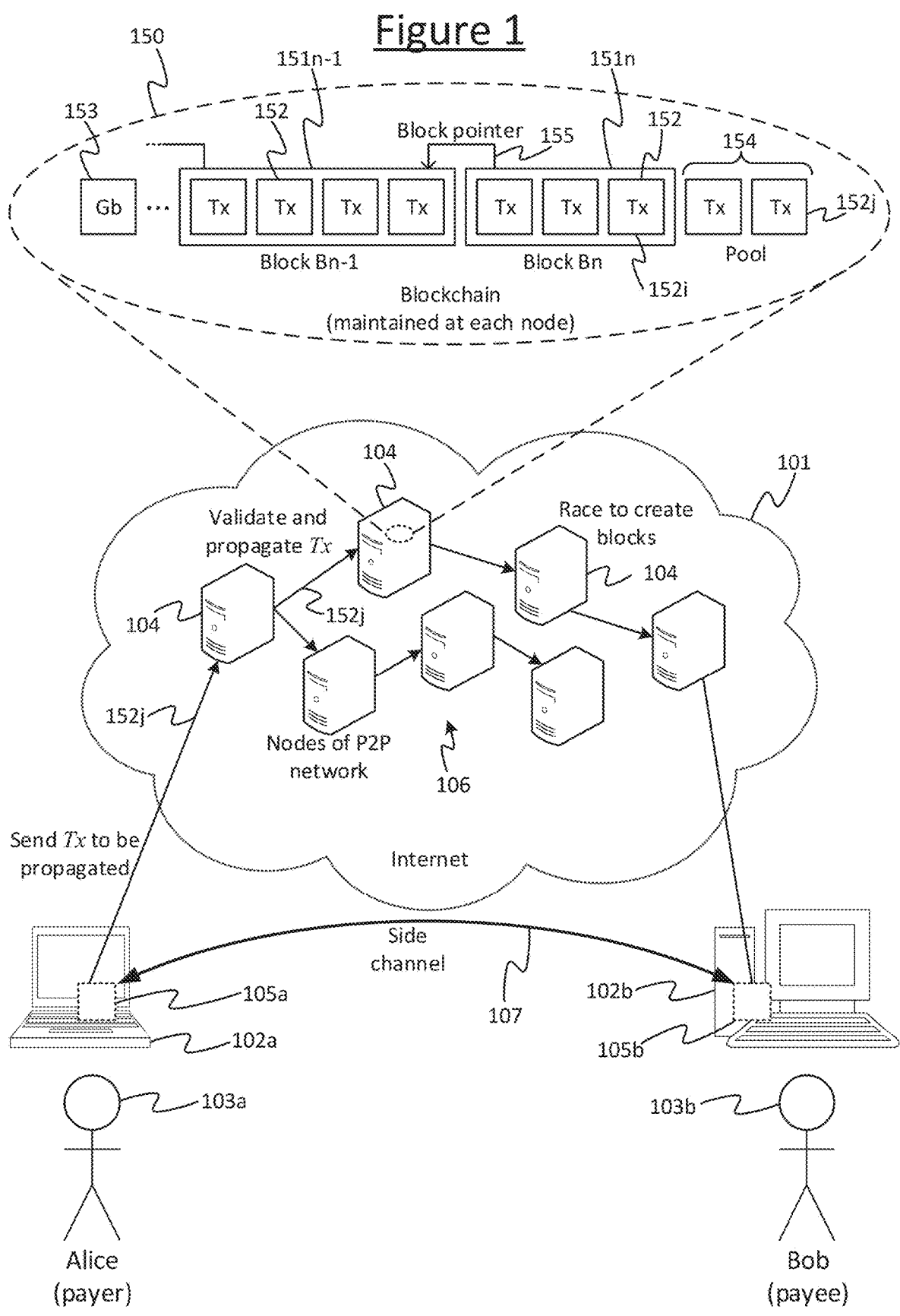
FIG. 1 is a schematic block diagram of a system for implementing a blockchain.

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the ordered set 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152j. In some cases a transaction 152 may have multiple outputs to split the input amount between multiple users or entities (one of whom could be the original user or entity 103a in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152j (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152j could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152j matches the expected signature, which depends on the previous transaction 152i in an ordered sequence of transactions 152. In such an output-based transaction protocol, this may comprise checking that the cryptographic signature or other authorisation of the party 103 included in the input of the new transaction 152j matches a condition defined in the output of the preceding transaction 152i which the new transaction assigns, wherein this condition typically comprises at least checking that the cryptographic signature or other authorisation in the input of the new transaction 152j unlocks the output of the previous transaction 152i to which the input of the new transaction is linked to. The condition may be at least partially defined by a script included in the output of the preceding transaction 152i. Alternatively it could simply be fixed by the blockchain node protocol alone, or it could be due to a combination of these. Either way, if the new transaction 152j is valid, the blockchain node 104 forwards it to one or more other blockchain nodes 104 in the blockchain network 106. These other blockchain nodes 104 apply the same test according to the same blockchain node protocol, and so forward the new transaction 152j on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node

104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
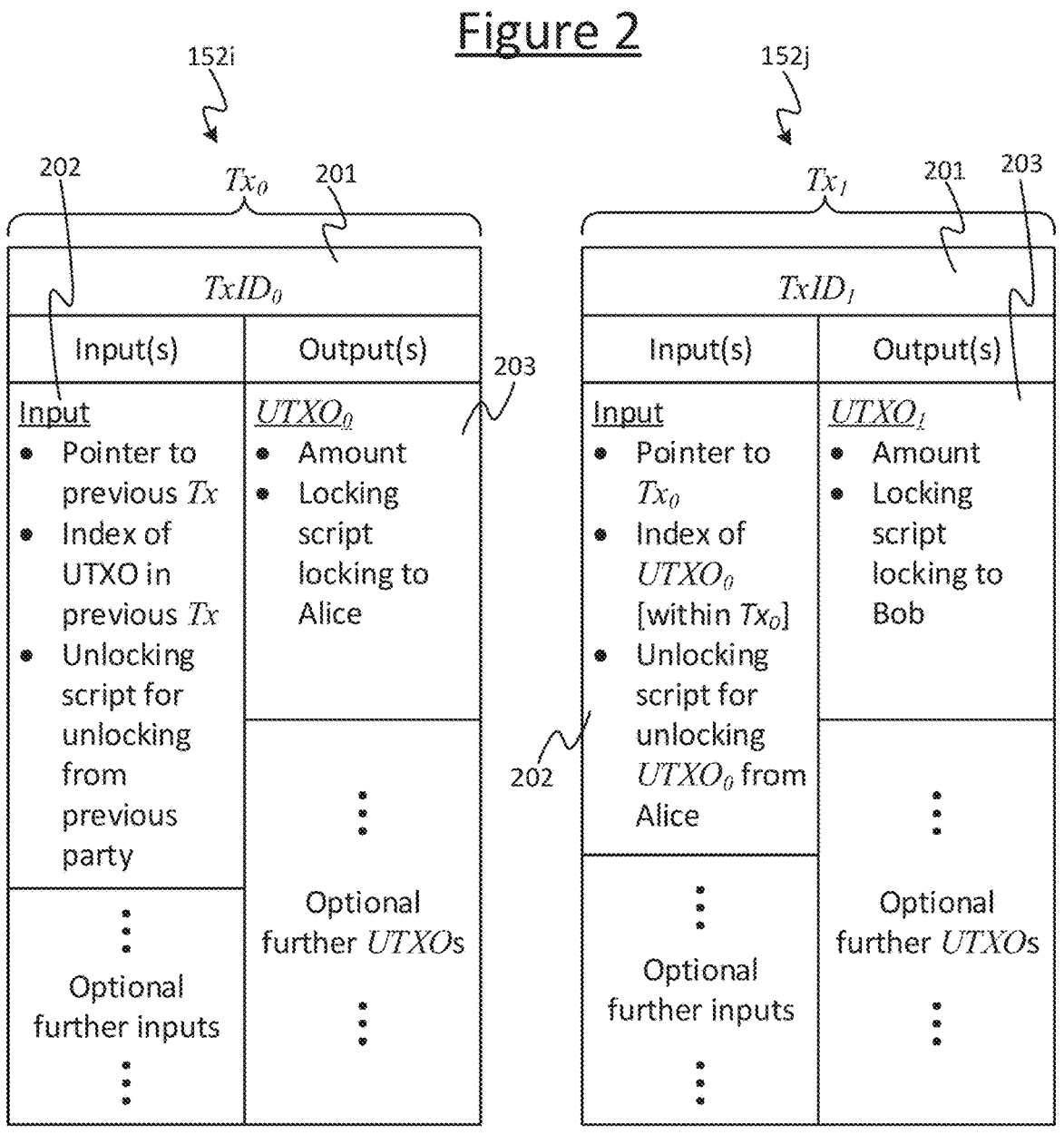
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<\text{Sig } P_A><P_A>\|[\text{Checksig } P_A]$$

where "∥" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

BIP Preliminaries

The following describes properties of some BIP protocols as examples of algorithms for generating keys and deriving keys. In embodiments the presently disclosed schemes may be apply as an improvement to a BIP protocol, but it will be appreciated that more generally the disclosed schemes may be applicable to any type of algorithm for generating a seed from which keys are derived.

Seed Generation

In BIP32, the seed S is generated as a raw bit-sequence from a PRNG. The bit-size of such a seed is equal to the size of entropy the seed provides for deriving the master key. The recommended size is 256 bits. The user is required to write down and keep safe the raw seed S, and communicate it when the wallet has to be recovered or shared. Humans are predisposed to failing in these tasks when directly manipulating a binary string.

In BIP39, a raw bit-sequence is generated from a PRNG initially, and the indicated range of "allowed size of entropy" is 128-256 bits. Then, a dictionary comprising $2048=2^{11}$ words is suggested, where each word corresponds to a different 11-bit binary value. The initial entropy is translated next into a mnemonic phrase consisting of up to 24 words. In order to distinguish between the initially produced raw seed and the mnemonic phrase below, they are denoted with S and $S_W$, respectively. In order to translate S into $S_W$, S is first divided into 11-bit substrings. A checksum is appended to the last substring to reach 11-bit length. Each substring is substituted with a corresponding word from the dictionary, and S is presented as the sequence of these words.

The relation between the length of $S_W$ in words and the bit-size of S is shown in the table below.

| bit-size of S (+checksum) | word-length of $S_W$ |
| --- | --- |
| 128 (+4) | 12 |
| 192 (+6) | 18 |
| 256 (+8) | 24 |

Communicating a random sequence of words is more user-friendly than communicating a binary string. A remaining challenge is that security and usability are conflicting objectives. Wallet security increases with increasing seed entropy. This, in turn, increases the length of the mnemonic phrase to the extent that it is increasingly difficult or infeasible to memorize. Balancing this challenge, BIP39 imposes a cap on allowed entropy.

Role of Seed in Key-Tree Derivation

The generated seed S provides the entropy needed in deriving the master private key $sk_{master}$. This derivation follows Algorithm 1, as described in BIP32.

Algorithm 1. Master Key Derivation

Calculate I=HMAC_SHA512(Key="Bitcoin seed", Data=S)

Split I into two 32-byte sequences: $I_L$ and $I_R$.

Use parse256($I_L$) to interpret the left 32-byte sequence as a 256-bit number (most significant byte first). This number is the master secret key $sk_{master}$ Use parse256($I_R$) to interpret the right 32-byte sequence as a 256-bit number.

This is the master chain code $c_{master}$.

In case $sk_{master}=0$ or $\geq n$, then $sk_{master}$ is invalid and a new seed S is generated.

The master private key and chain code $Sk_{master}$ and $c_{master}$, with the entropy embedded in them from the seed S, are next used for deriving the rest of the key tree. In Algorithm 2, $sk_{master}$ and $c_{master}$ are the first parent key and chain code $sk_{parent}$ and $c_{parent}$. Then, in a chain of key derivations, parents produce children, and children in turn become parents. A child private key $sk_{child,i}$ and a chain code $c_{child,i}$ are derived as follows.

Algorithm 2. Key Tree Derivation: Hardened and Non-Hardened Child Keys

If the key index $i \geq 2^{31}$, the child is a hardened key and derived from:

I=HMAC_SHA512 (Key=$c_{parent}$, Data=0x00||$ser_{256}(sk_{par})$ ||$ser_{32}(i)$), where $ser_{256}(sk_{parent})$ serializes integer $sk_{parent}$ into a 32-byte sequence (most significant byte first). Also, $ser_{32}(i)$ serializes the 32-bit unsigned integer i into a 4-byte sequence, and 0x00 pads $ser_{256}(sk_{par})$ to a length of 33 bytes.

If the key index $i<2^{31}$, the child is a non-hardened key and derived from:

I=HMAC_SHA512 (Key=$c_{parent}$, Data=$ser_p(sk_{parent} \cdot G)$ ||$ser_{32}(i)$), where $ser_p(sk_{parent} \cdot G)$ serializes point coordinates $sk_{parent} \cdot G=(x, y)$ into a compressed-form byte sequence (0x02 or 0x03)||$ser_{256}(x)$, where the header byte depends on the sign of the omitted y-coordinate.

Split I into two 32-byte sequences: $I_L$ and $I_R$.

Return child-key $sk_{child,i}$=parse256($I_L$)+$sk_{parent}$ (mod n) where n=

Return child chain code $C_{child,i}=I_R$.

In case parse256($I_L$)$\geq n$ or $sk_{child,i}=0$, then $sk_{child,i}$ is invalid and the algorithm continues with the next value for i. (the probability for this is $\leq 2^{-127}$).

Bio-Locked Seed

Embodiments of the present invention enable a seed, or some other secret value, to be stored on the blockchain in a biometric vault system. The biometric vaults within the system are locked, and therefore can only be unlocked, based on a user's biometric features, e.g. based on a user's fingerprint(s). That is, biometric information is extracted from the fingerprint, e.g. during a live reading, and used to lock a seed within a vault system. The vault system is therefore uniquely linked to the user's biometric data. The vault system may then be unlocked at a later time based on another reading, e.g. by scanning the user's fingerprint. As will be discussed below, the vault system may also be generated based on multiple biometric readings, e.g. of the same or different types, and/or of the same or different users.

For the sake of brevity, embodiments of the present invention will be described with reference to Alice 103a as described above. That is, the embodiments of the present invention may be performed by Alice 103a. Note that this does not mean that the embodiments can only be performed by a user such as Alice 103a. Rather, embodiments of the present invention may be performed by a computing device that is configured to perform some or all of the actions attributed to Alice 103a above. Equally, embodiments may be performed by a user operating a computing device running a client application that is configured to perform some or all of the actions attributed to Bob 103b above. It is also not excluded that embodiments may be performed by a party other than a user, e.g. a party operating a server comprising one or more physical server units, or even whole a data centre.

In general, the method comprises obtaining at least one biometric reading, and generating a vault system based on the biometric features identified in the at least one biometric reading. In some examples, more than one biometric reading, each containing its own respective biometric features, may be used to generate the vault system. A biometric reading refers to an observation, i.e. measurement, recording, etc. of a respective biometric characteristic. For instance, a biometric characteristic may be a fingerprint, an iris, a finger-vein pattern comprising at least one finger-vein, a wrist-vein pattern comprising at least one wrist-vein, a facial pattern, etc. As a particular example, a fingerprint can be "read" using a fingerprint scanner, e.g. embedded within a mobile device. Similarly, an iris can be read using an iris-scanner, or more generally an eye scanner.

Consider the case where the vault system is to be generated, and therefore unlocked, based on a single biometric reading, e.g. a fingerprint (note that the term "fingerprint" is used herein to also include thumbprints). Note that this is non-limiting, and the teaching apply applies generally to using multiple biometric readings.

Alice 103a scans her fingerprint, e.g. using her mobile phone or laptop. Alice 103a, or rather her device, identifies a plurality of biometric features within the fingerprint.

Figure 3:
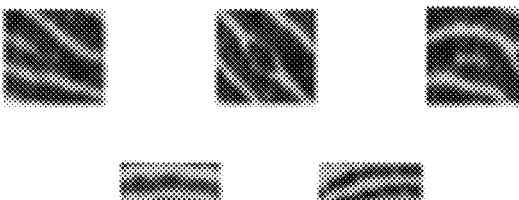
FIG. 3 illustrates example biometric features in a fingerprint.

FIG. 3 illustrates example biometric features that may be present within a fingerprint, e.g. ridges, dots, enclosures, islands, etc. Also shown is an alignment reference-frame overlaid on a fingerprint. In this example, a section is a concentric circle, and each concentric circle includes one or more features.

Note that identifying the biometric features does not necessarily mean identifying each and every feature within a reading, though that is not excluded. For example, in some examples, only certain types of biometric features are identified. The types of features that are to be identified can be adapted without any loss of generality.

Using the identified biometric features, Alice 103a generates one or more first biometric vaults. Each first biometric is used to lock a respective first-level secret value. As will be discussed further below, in some embodiments a first-level secret value may be used as a seed, e.g. for deriving private keys. In other embodiments, a first-level secret value may be used, together with other first-level secret values, to generate a second secret value which may then be used to derive private keys.

Each first biometric vault corresponds to a particular biometric feature, e.g. a loop in a fingerprint. The corresponding biometric feature is referred to below as the target feature for that first biometric vault. In some examples, a first biometric vault may be generated for each biometric feature, or for particular types of biometric features, e.g. only loops.

Each first biometric vault comprises a plurality of binary data pairs. Each binary data pair comprise a first binary value and a second binary value. At least some of the first binary values are generated based on the target biometric feature and some or all of the other identified biometric features. More particularly, at least some of the first binary values are respective binary representations (referred to below as "first binary representations") of the target feature relative to respective other ones of the identified features. E.g. a binary representation of the target feature relative to a first other feature, a binary representation of the target feature relative to a second other feature, and so on.

These first binary representations are relative representations of minutiae (relative to each other) and non-aligned representations. As discussed below, for each vault, the data pairs in each vault are preferably produced after first applying a random functional transformation to a minutia.

Therefore at least some of the second binary values are paired with a respective first binary representation. Those second binary values that are paired with a respective first binary representation may be used to reconstruct the first-level secret value locked by that first biometric vault. At least a threshold number of those second binary values are required to reconstruct the first-level secret value. In some examples, all of those second binary values are required.

As will be discussed in more detail below, some of the first binary values may be binary representations of mock biometric features. A biometric feature is a feature that is not actually present in the biometric feature, i.e. it is artificially generated, it does not exist as part of the user's real biometric characteristic. These particular binary representations will be referred to below as "mock binary representations" to distinguish from the first binary representations which are generated based on biometric features actually present in the biometric reading. Each mock biometric representation takes the same format as a first biometric feature and so the two are indistinguishable when stored in the vault. Furthermore, each mock biometric representation is paired with a mock second binary value. A mock second binary value cannot be used to reconstruct the first-level secret value.

Additionally, if a mock second binary value is used when attempting to reconstruct the first-level secret value, the attempt will not result in the first-level secret value. That is, an incorrect value will be derived. Note that mock biometric features are not required in all cases.

In these cases, every vault includes such mock binary representations, and preferably there are at least in proportion 1:10 in a vault, e.g. 30 real and 300 mock binary representation. A mock binary representation is based on the relative position of a functionally-transformed real biometric feature in relation to a mock feature. (The mock features are iteratively added so that the minimum distance among bio-features—either real or mock—is above a physical threshold for recognition as different feature.) A real binary representation is based on the relative position of a functionally-transformed real biometric feature in relation to another real feature.

Alice 103a generates one or more blockchain transactions. Each blockchain transaction is used to store a respective vault on the blockchain 150, or a respective slice (i.e. division) of a vault on the blockchain. In some instances, Alice 103a includes a respective first biometric vault within a blockchain transaction and transmits the blockchain transaction(s) to the blockchain network 106. In other instance, Alice 103a divides one or more first biometric vaults into two or more slices, and then includes each slice in a different blockchain transaction. Those transactions are then transmitted to the blockchain network 106.

In other embodiments, Alice 103a generates a respective second biometric vault for each first biometric vault. Each second biometric vault comprises a respective first biometric vault. As will be discussed below, each second biometric vault may comprise further information. The second biometric vaults, or slices of the second biometric vaults, are included in different transactions before being transmitted to the blockchain network 106.

In some instances, each first or second biometric vault is encrypted before included in a respective transaction. In the case where the first or second biometric vaults are divided into slices, those slices may be encrypted.

For each first biometric vault, each first binary representation may be generated based on a respective first vector, where each first vector is generated based on the target biometric feature relative to a respective other identified feature. A first vector describes the target biometric feature relative to another identified feature. For instance, a first vector may describe a relative position, angle, and/or orientation of the target feature relative to another identified feature. In some instances, a respective second binary representation of the relative position, angle, and/or orientation of the target feature relative to another identified feature is generated, and the respective second binary representation(s) are used to generate a respective first binary representation. For example, the second binary representations may be concatenated or otherwise combined.

The first binary representations may be generated using an alignment-free binarization technique. Such a technique does not consider the alignment of each minutia to a central reference frame. Instead, it considers minutia features as relative to other minutia features, as shown in FIG. 4. FIG. 4 (LHS) shows a minutia feature surrounded by other minutiae features, whilst FIG. 4 (RHS) shows a minutia's position in relation to other minutiae.

Figure 5:
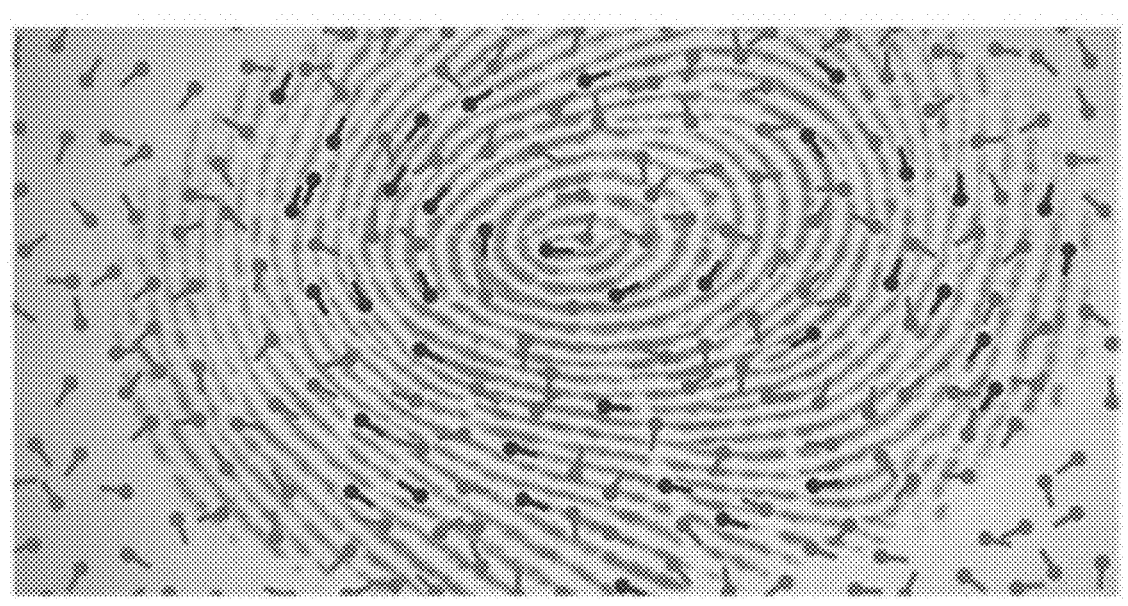
FIG. 5 illustrates the orientation of minutiae as the tangents to the ridges at the minutia points in a fingerprint.

Let $M_i$ denotes a minutia, and let it be quantified into a set of $(N_M-1)$ pear-polar vectors $v_{ij}=(r_{ij},\varphi_{ij},\vartheta_{ij})$ in relation to minutiae $M_j, 1\leq i,j\leq N_M$. Here, $r_{ij}$ is the distance between $M_i$ and $M_j$, while $\varphi_{ij}$ is the counter-clockwise angle between the orientation of $M_i$ and the direction of $\overrightarrow{M_iM_j}$, and $\vartheta_{ij}$ is the orientation difference between $M_i$ and $M_j$, as visualised in FIG. 4 (LHS). The orientation of a minutia is the tangent to the ridge at the minutia point (see FIG. 5), such as the tangent to a ridge-end or to an island (see FIG. 3). Thus, each minutia $M_i$ is represented with a set of vectors $M_i \{v_{ij}\}_{j=1,j\neq i}^{N_M}$ and the fingerprint is represented with the set of minutiae $\{M_i\}_{i=1}^{N_M}$. Then, each of the real-number valued $r_{ij},\varphi_{ij},\vartheta_{ij}$ is rounded down to an integer, and the integers are interpreted as binary strings $B_{r_{ij}}, B_{\varphi_{ij}}, B_{\vartheta_{ij}}$ (i.e. the "second binary representations"). These are concatenated into strings $B_{ij}$ of length 1. Each minutia $M_i$ is binarized into the set $B_i$ of binary strings $B_{ij}$ (i.e. the "first binary representations"), and a fingerprint is binarized into the set B:

$$B_i=\{B_{ij}\}_{j=1,j\neq i}^{N_M}, B=\{B_i\}_{i=1}^{N_M}$$

The first binary representations above are generated based on a respective first vector $v_{ij}$. In some embodiments, the first binary representation are generated based on a transformed version of the first vector. In these embodiments, a respective transformation is applied to the first vector to generate a transformed first vector. The transformation is applied to remove correlations between the biometric features, i.e. between a target biometric feature and the respective other identified features. For instance, each transformed first vector may comprise transformed values of the relative position, angle, and/or orientation of the target feature relative to a respective other identified feature.

The transformed first vectors may be generated by applying a respective co-ordinate and rotation invariant characteristic to the values of the (non-transformed) first vector. The characteristic is unique to each target biometric feature of a respective first biometric vault. Additionally or alternatively, a pseudorandomly generated transformation value may be used to transform the values of the first vector.

Figure 6:
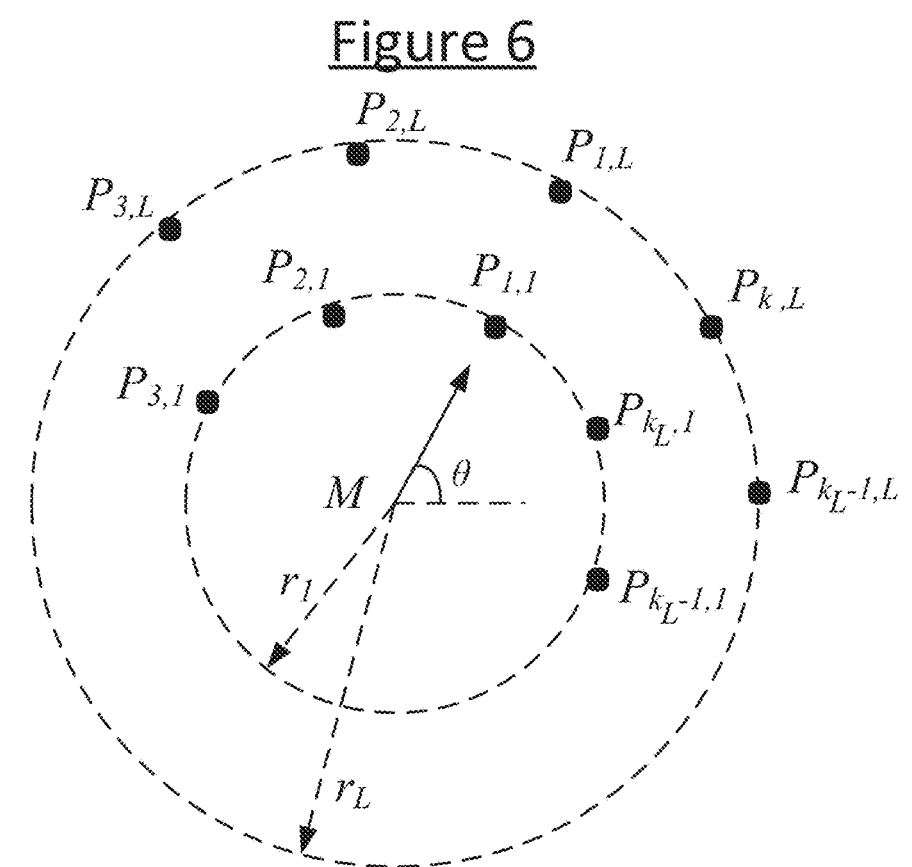
FIG. 6 illustrates an example functional transformation of minutia.
Figure 7:
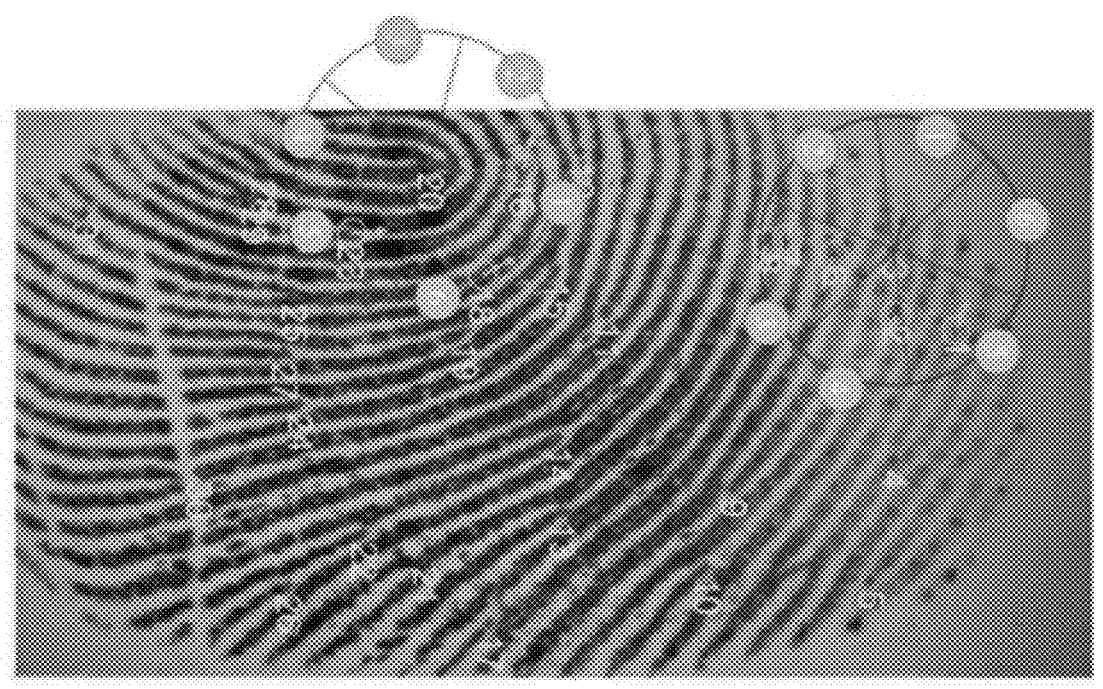
FIG. 7 illustrates the extraction of an invariant value for a minutia.

In more detail, a functional transformation is a security enhancement that prevents any correlation among $B_i$, and allows unlimited reusability of binary structures $\{B_{ij}\}_{j=1,j\neq i}^{N_M}$. A functional transformation of each minutia $M_i$ prior to its quantification and binarization can be performed as follows. First, an invariant value is extracted for $M_i$ through the following steps. A number E of concentric circles with radius $r_e$, $1\leq e\leq E$, are considered around minutia $M_i$. In each circle e around $M_i$, a number $N_e$ of sample points $P_{ne}$, $1\leq n_e\leq N_e$ are considered. These points are not related to minutiae $M_j$, $1\leq j\leq(N_M-1)$ and are distributed evenly along circle e, counter-clockwise from the orientation of $M_i$ (see FIGS. 6 and 7).

Figure 8:
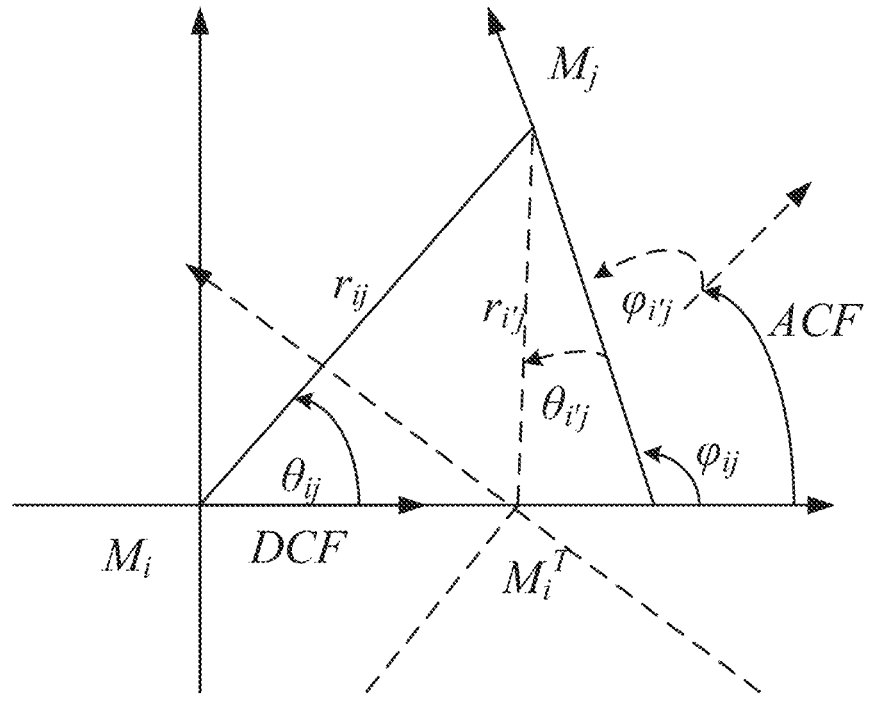
FIG. 8 illustrates an example functional transformation of minutia, FIG. 9 schematically illustrates an example transaction for recording a vault on the blockchain, FIG. 10 schematically illustrates an example transaction for recording a vault slice on the blockchain, FIG. 11 schematically illustrates an example transaction for a different user recording a vault on the blockchain, FIG. 12 schematically illustrates an example transaction for a different user recording a vault slice on the blockchain, FIG. 13 schematically illustrate an example method for a first user recording a vault system on the blockchain according to some embodiments, FIG. 14 schematically illustrate an example method for a first user reconstructing a seed according to some embodiments, and FIG. 15 schematically illustrate an example method for two users recording a shared vault system on the blockchain according to some embodiments.

A coordinate-invariant and rotation-invariant characteristic $\delta_i=[\delta_{i1}, \ldots, \delta_{ik}, \ldots, \delta_{i,\Sigma(Ne)}]$ is evaluated for each $M_i$, where $\delta_{ik}$ is the difference between the orientation of $M_i$ and the ridge-direction at the $k^{th}$ sample point. Then a random vector $u_i$ of length $Z(N_e)$ is generated, and a distance-change (DC) value and an angle-change (AC) value are produced as functions of $\delta_i$ and $u_i$, i.e. $DCF(\delta_i, u_i)$ and $ACF(\delta_i, u_i)$. The changes DC and AC are applied to minutia $M_i$ to transform it into minutia $M_i^T$, prior to its updated quantification and binarization. FIG. 8 visualizes the unique (due to $\delta_i$) and random (due to $u_i$) transformation of $M_i$ into $M_i^T$, where T stands for "transformed". This in turn transforms the quantifications $v_{ij}=(r_{ij},\varphi_{ij},\vartheta_{ij})$ into $v_{ij}^T=(r_{ij}^T,\varphi_{ij}^T,\vartheta_{ij}^T)$, and the minutia binarization $B_i=\{B_{ij}\}_{j=1,j\neq i}^{N_M}$ into $B_i^T=\{B_{ij}^T\}_{j=1,j\neq i}^{N_M}$. Thus the fingerprint binarization $B=\{B_i\}_{i=1}^{N_M}$ transforms into $B^T=\{B_i^T\}_{i=1}^{N_M}$. The "first binary representations" are now $B_{ij}^T$.

As discussed above, each first biometric vault may comprise one or more binary representations of mock biometric features. Each mock feature may be assigned a respective second vector taking the same format as the first vectors. The second vectors are assigned such that a minimum distance from each real feature. Preferably there are many more mock features than real identified features (recall that the identified features may not necessarily include all features present in a reading).

More specifically, considering the set of binary strings $B_i^T=\{B_{ij}^T\}_{j=1,j\neq i}^{N_M}$ representing minutiae $M_i^T$, $1\leq i\leq N_M$, an iterative process may be performed to generate and add mock minutiae $M_i^{T,mock}$, $1\leq i\leq N_M^{mock}$, so that the minimum distance among all vectors $v_{ij}^T=(r_{ij}^T,\varphi_{ij}^T,\vartheta_{ij}^T)$ and $v_{ij}^{T,mock}=(r_{ij}^{T,mock},\varphi_{ij}^{T,mock},\vartheta_{ij}^{T,mock})$, of true and mock minutiae, is above a threshold. Next, the set of binary strings $$B_i^{T,all} = \{B_{ij}^{T,all}\}_{j=1,j\neq i}^{N_M+N_M^{mock}}$$

may be created where $N_M \ll N_M^{mock}$.

The generation of the second binary values will now be described. Preferably the first-level secret value is a pseudorandom value. The first-level secret value is split into at least a first threshold number of elements. Preferably the first-level secret value is split into more than the first threshold number of elements. Each element of the first-level secret value is used as a coefficient of a first polynomial function. For the first binary representations of the real biometric features, a second binary value paired with a given first binary representation is generated by evaluating the first polynomial function using that first binary representation. The first-level secret value can then be reconstructed using polynomial interpolation if at least the threshold number of second binary values paired with first binary representations are available.

More specifically, Alice 103a may generate a random string $S_i$ and divide it in $n<N_M$ segments of length l, so that $S_i=s_{i,n-1}\| \ldots \|s_{i,0}$. Then, encode $S_i$ into a polynomial $p_i(x)=s_{i,n-1}x^{n-1}+ \ldots +s_{i,0}x^0$. For a true minutia $M_i^T$, if $M_j^T$ is a true minutia, then allocate to $B_{ij}^T$ a genuine evaluation $y_{ij}=p_i(B_{ij}^T)$. If the minutia is mock $M_j^{T,mock}$ is mock, then allocate to $B_{ij}^{T,mock}$ a mock value $y_{ij}\neq p_i(B_{ij}^{T,mock})$.

In examples where the vault system comprises a plurality of first biometric vaults, each locking a respective first-level secret value, those (e.g. some or all) first-level secret values can be used to unlock a second secret value. The second secret value is preferably a pseudorandom value. The second secret value is divided into at least a second threshold number of elements. Preferably the second secret value is split into more than the second threshold number of elements. Each element of the second secret value is used as a coefficient of a second polynomial function. The second polynomial value is evaluated using each first-level secret value to generate a respective outcome. The respective outcome is then stored in a respective second biometric vault comprising the respective first biometric vault containing the respective first-level secret value. Therefore using at least the second threshold number of first-level secret values and the respective outcomes allows the second secret value to be reconstructed through polynomial interpolation.

Alice 103a may generate a random string S, where a number L of binary strings $S_i$ is sufficient to recover S. Then, divide S into (L+1) segments, so that $S=_L s\| \ldots \|_0 s$, and evaluate the polynomial $p(x)=_L sx^L+ \ldots +_0 sx^0$ at each $S_i$. The construction $\{\{Vault_i,p(S_i)\}_{i=1}^{N_M},\}$ is a biometric vault system made up of second biometric vaults $\{Vault_i,p(S_i)\}$, where each $$Vault_i = \{B_{ij}^{T,all}, y_{ij}\}_{j=1,j\neq i}^{N_M+N_M^{mock}}$$

is a separate first biometric vault biometric vault.

The techniques described herein achieve the dual objective set out above. The generated seed is not memorised and is user-friendly to reproduce, and there is no restriction on the size of seed entropy.

Each vault in the vault system is biometrically locked and can be unlocked only by the intended user. Each vault encrypts a different set of binarized biometric features. Such a set may include both true and mock features. The number of mock features is significantly larger, and there are preferably more true features than the sufficient number for unlocking the corresponding vault. If a sufficient number of biometric features in a vault are matched in response to a live reading from a user, then the corresponding vault is unlocked.

Unlocking a vault means that a random binary string (first-level secret value) is recovered through polynomial interpolation. This string may be used as a partial clue towards producing (or re-producing) the seed (second secret value).

The vault system includes more vaults than the sufficient number for (re-)producing the seed. If a sufficient number of vaults are unlocked in response to the live biometric reading from the user, then a polynomial interpolation recovers the seed. The clues and the seed are generated as PRNG bite-sequences, and the seed is of arbitrary length. The vaults in the system may be randomly distributed among OP_RE-TURN outputs of blockchain transactions. The approach also provides for efficient revocation and replacement of a vault.

In some embodiments, Alice 103*a* may generate a master private key and derive one or more auxiliary keys from that master private key. For example, Alice may generate a HD wallet. In some instances, Alice 103*a* may generate a respective master private key and auxiliary key(s) for each first second vault.

Each second biometric vault may be encrypted with one of the auxiliary keys, e.g. each second biometric vault may be encrypted using a different auxiliary key, one from each HD wallet.

Similarly, the respective transformation value used to transform the plurality of first vectors related to each target feature may be one of the auxiliary keys, e.g. a different auxiliary key for each respective transformation value. That is, a respective auxiliary key from a respective HD wallet may be used as the transformation value when generating a respective first biometric vault.

Moreover, the blockchain transaction(s) used to record a respective second vault on the blockchain may each have a spendable output locked to a respective public key corresponding to a respective auxiliary key. For example, a transaction containing a respective second biometric vault may be locked to a public key corresponding to one HD wallet, and a different transaction containing a different second biometric vault may be locked to a public key corresponding to a different HD wallet. If a second biometric vault is divided into slices, one slice per transaction, those transaction may be locked to the same public key or to different public keys.

As a particular example, consider the first bio-vaults $$\text{Vault}_i = \left\{ B_{ij}^{T,all}, y_{ij} \right\}_{j=1, j \neq i}^{N_M + N_M^{mock}},$$

$1 \leq i \leq N_M$. Note that using the same minutiae $M_i$, but two different functional transformation T' and T'', produces two different vaults Vault'$_i$ and Vault''$_i$ that can be included in the same or in different vault systems. Note also that $N_M$ is the number of true biometric minutiae, and $N_M^{mock}$ the number of mock minutiae.

A bio-vault system comprises up to $N_M$ vaults Vault$_i$, $1 \leq i \leq N_M$. The following steps are completed in order to produce the system.

1. Generate off-line $$\text{Vault}_i = \left\{ B_{ij}^{T,all}, y_{ij} \right\}_{j=1, j \neq i}^{N_M + N_M^{mock}},$$

$1 \leq i \leq N_M$, $N_M \ll N_M^{mock}$.

2. For each Vault$_i$, generate a different standard HD wallet to serve as an auxiliary wallet, in the registration and revocation of Vault$_i$.

3. For each Vault$_i$, access the key-tree of wallet$_i$, where sk$_{master_i}$ is the master key of wallet$_i$. Produce/get the hardened secret sk$_{master_i}$/((i+$N_M$)mod $2^{31}$)$_H$/1$_H$ and denote it with u$_{i,T}$. Note that this is merely an example and other keys in the HD wallet may be used.

4. Evaluate u=$\Sigma_{i=1}^{N_M}$ u$_{i,T}$ and evaluate the polynomial p(u). Note that the coefficients of polynomial p are PRNG generated in advance, see above.

5. Discard the coefficients of p and the values u and u$_{i,T}$. Keep the value p(u).

6. Note that the coefficients of p can be reconstructed later, by unlocking vaults and using polynomial interpolation. Note also that the values u and u$_{i,T}$ can be reconstructed later by accessing the auxiliary wallets used for registering the vault system on-chain.

7. Produce Vault$_{i,sk}$={Vault$_i$,p(S$_i$),p(u)}, $1 \leq i \leq N_M$.

8. Produce the system of vaults, System= {Vault$_{i,sk}$}$_{j=1, j \neq i}^{N_M}$.

Once the vault system is produced, the vaults are distributed among the OP_RETURN outputs of blockchain transactions. The template for these transactions is introduced next. Once a vault system is registered on-chain, it can be used at any time. In response to a live reading from the user, the corresponding transactions are accessed, then vaults are unlocked off-chain, and a PRNG seed S of arbitrary high entropy is reconstructed (interpolated). The seed S is the concatenation of the parameters of polynomial p. The biometric master key for the new biometric wallet is derived from S, and then as is discarded. It can be reconstructed any time, in response of another live biometric reading from the same user.

The transaction template is constructed as follows.

The template comprises one P2PKH output and one OP_RETURN output.

The OP_RETURN output here to record the encrypted Vault$_{i,sk}$, once Vault$_{i,sk}$ is produced.

The P2PKH output is used for revocation of Vault$_{i,sk}$. While this output is unspent, Vault$_{i,sk}$ is active and used in generating/reconstructing seeds for biometric wallets.

Once the P2PKH output is spent, Vault$_{i,sk}$ becomes inactive.

A new vault can be registered as part of the vault system.

While processing off-line a live biometric reading from the user, the biometric algorithm produces in the background partially constructed transactions TxID$_i$,$1 \leq i \leq N_M$, that exclude the OP_RETURN data. Once the observed minutia features have been transformed and binarized, and the Vault$_{i,sk}$ have been produced, then the partially constructed transactions are populated offline. FIG. 9 illustrates an example transaction. Next, the transactions are broadcasted to the blockchain network 106. The order they are recorded in on-chain does not affect the function of the vault system.

Each registration/revocation transaction TxID$_i$ may be generated using an auxiliary wallet$_i$. Public and private keys (hardened and non-hardened) from different levels and branches of the auxiliary wallet's key-tree are used in generating the transaction. Note that if an auxiliary wallet is compromised, or a single vault is compromised, then the bio-locked seed is not compromised and the bio-vault system continues to function, due to redundancies in and resilience of its structure.

The skilled person will be familiar with the structure of a HD wallet. Denote the keys at different levels and in different branches of a wallet, with sk$_{master_i/n_{account}/0/n_{adress}}$ for $1 \leq n_{account} \leq N_{account}$, $1 \leq n_{address} \leq N_{address}$, and let a subscript H indicate if the key is hardened or non-hardened. Then, the revocation ($PK_{Alice}^{rev\_vault_i}$) and encryption keys ($EK_i$) used in transactions $TxID_i$ are presented below:

$$PK_{Alice}^{rev\_vault_i}=sk_{master_i/i/0/0}*G(\text{non-hardened } sk)$$

$$EK_i=sk_{master_i/i_H/1_H}(\text{hardened } sk)$$

$$u_{i,T}=sk_{master_i/((N_M-i)mod\ 2^{31})_H/1_H}$$

The random value $u_{i,T}$ needed for the evaluation of the functional transformation (random repositioning) of minutia $M_i$ into $M_i^T$ prior to its binarization into Vault$_i$, may be produced as shown above. Note that if $u_{i,T}$ is compromised, than the functional transformation T is not compromised, as parameter $\delta_{i,T}$ in the transformation functions $DCF(\delta_i,u_i)$ and $ACF(\delta_i,u_i)$ is not compromised. Therefore, minutia $M_i$ remains reusable for vault systems.

As mentioned, each second biometric vault may be split into slice. Each Vault$_i$ may be represented as unit vault-slices:

$$\text{vault\_slice}_{ij}=\{B_{ij}^{T,all},y_{ij},p(u)\},1\le i\le N_M,1\le j\le (N_M+N_M^{mock}),j\ne i$$

Then instead of one transaction per Vault$_i$, as in FIG. 9, the vault is registered with a maximum of $(N_M+N_M^{mock}-1)$ transactions. If a larger slice, than a unit slice of a vault, is registered per transaction, i.e. for vault\_slice$_{i,n_i}=\{B_{ij}^{T,all}$, $y_{ij},p(u)\}_{j=1}^{n_i},n_i\ll(N_M N_M^{mock}-1)$, then the number of transactions is less than the maximum. Then, slices of a bio-vault can be revoked and updated instead of revoking a whole vault at a time. The number of transactions can be optimised in relation to mining and registration fees. FIG. 10 illustrates an example transaction for recoding a vault slice on the blockchain 150.

FIGS. 11 and 12 illustrate similar transactions in the case that some of the vaults in the vault system are generated based on Alice's biometric characteristics and some of the vaults in the system are generated based on a different user's characteristic, e.g. Carl 103c.

Figure 13:
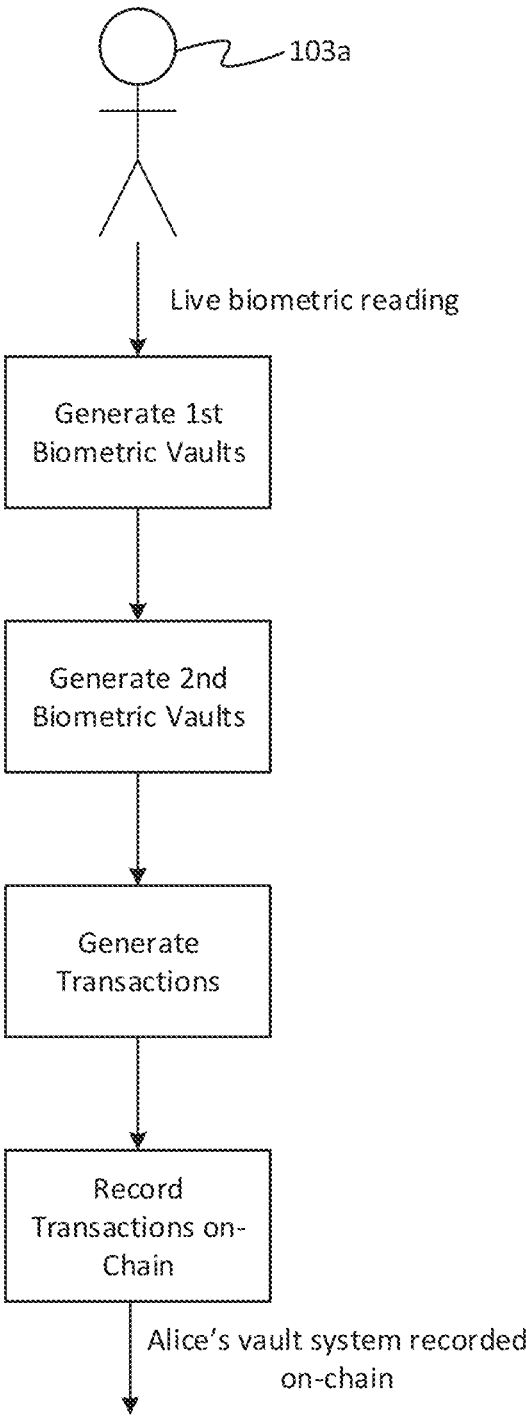
Figure 15:
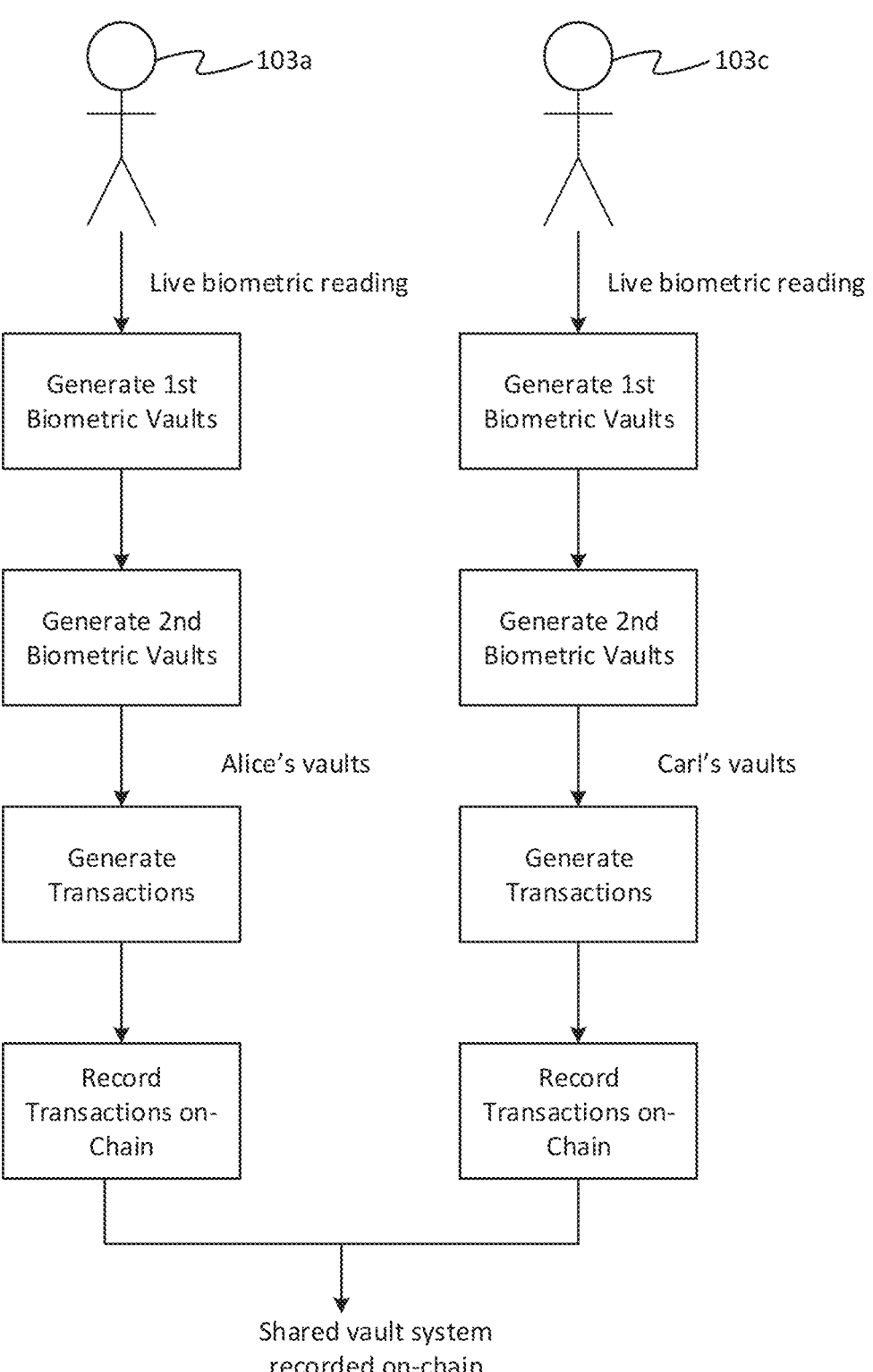

FIG. 13 illustrates an overview of the method for Alice 103a recording a second-level secret on chain. FIG. 15 shows a similar method, except that at least some of the vaults in the system are generated by Carl 103c. In both cases, each user provides a respective live biometric reading which is used to generate a respective set of biometric vaults. The biometric vaults are recorded on the blockchain. In the example of FIG. 15, a reading from both Alice 103a and Carl 103c are required in order to reconstruct the shared second-level secret.

Figure 14:
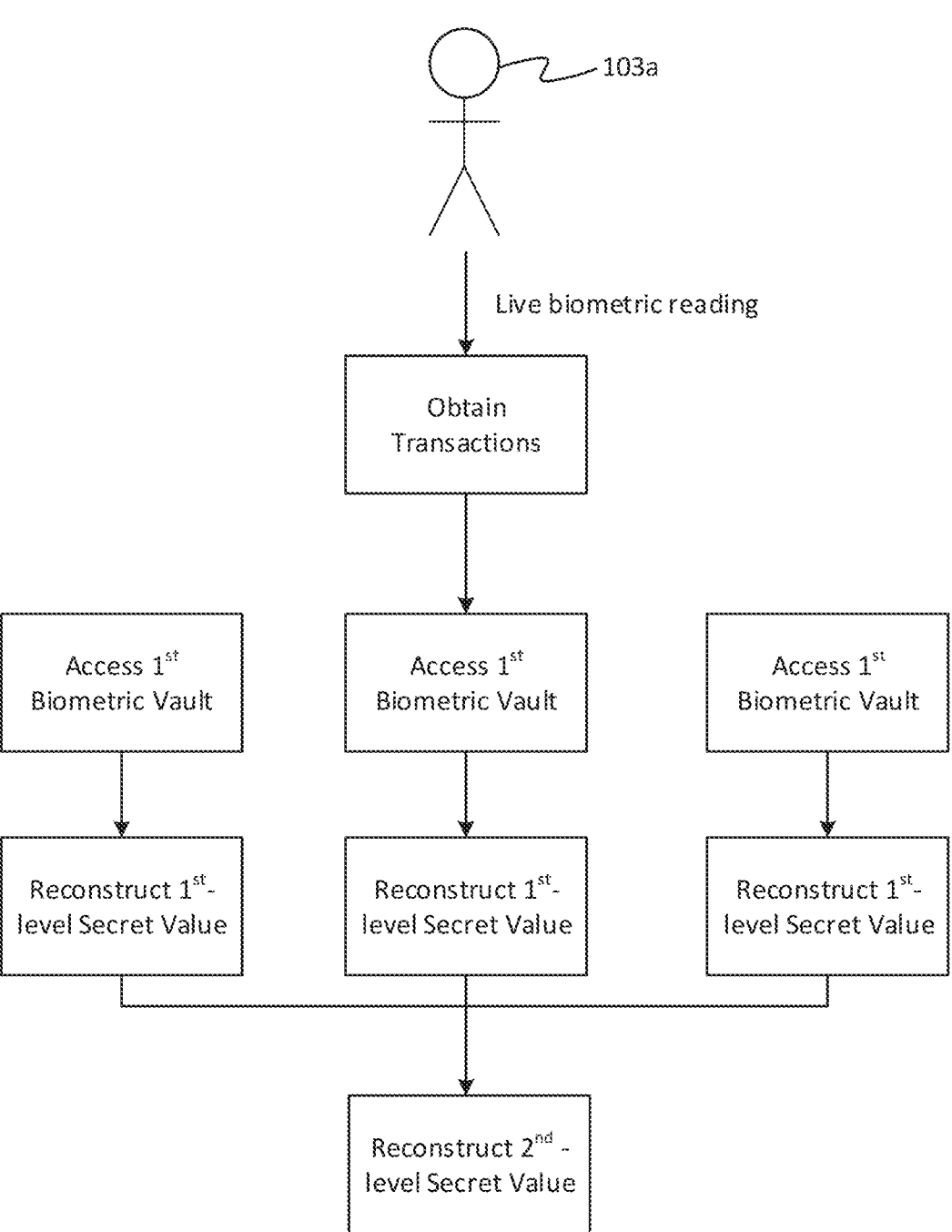

Alice 103a may repeat some of the same steps described above a later time in order to unlock one or more vaults, e.g. to reconstruct one or more first-level secret values, and optionally, the second secret value. This process is shown in FIG. 14. Alice 103a may scan her fingerprint, and in response, a plurality of biometric features are identified, from which a respective candidate first binary representation is produced. Then, the first binary representations stored within a first vault and that match the candidate representations are identified. The second binary values paired with those first binary representations are used to reconstruct the first-level secret value using polynomial interpolation. The process may be repeated for multiple first vaults in order to reconstruct a second secret value.

In some embodiments, Alice 103a provides two or more biometric readings. Some biometric vaults may be generated based on one reading, and some biometric vaults may be generated based on other readings. In some examples, the readings are of the same biometric characteristic, e.g. two or more fingerprints. In other examples, different biometric characteristics may be used, e.g. fingerprint and iris, or fingerprint and facial pattern.

In some embodiments, both Alice 103a and another user, e.g. Bob 103b provide one or more respective biometric readings. This may be used to generate a shared vault system, e.g. some vaults are generated using Alice's reading(s), and some vaults are generated using Bob's reading(s). In these instances, both Alice 103a and Bob 103b are required to provide their respective reading(s) in order to reconstruct the second secret value.

Note that in some examples, a given reading may be made up of several instances of the same reading. For example, Alice's same fingerprint may be scanned multiple times to improve the accuracy of the reading.

Conclusion

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of storing a biometric vault system on a blockchain, wherein the biometric vault system comprises one or more biometric vaults, each biometric vault locking a respective secret value, and wherein the method comprises: obtaining at least one biometric reading; identifying a plurality of biometric features from the at least one biometric reading; generating one or more first biometric vaults, wherein each first biometric vault corresponds to a respective target one of the plurality of biometric features and comprises a respective plurality of binary data pairs, each data pair comprising a first binary value and a second binary value, wherein at least some of the first binary values are respective first binary representations of the target biometric feature relative to respective other ones of the identified biometric features, and wherein at least a first threshold number of the second binary values that are paired to the respective first binary representations are required to reconstruct a respective first-level secret value; generating one or more blockchain transactions, wherein each blockchain transaction comprises a respective output comprising at least part of a respective second biometric vault, wherein each second biometric vault comprises a respective first biometric vault; and transmitting the one or more blockchain transactions to the blockchain network.

Statement 2. The method of statement 1, wherein the at least part of the respective second biometric vault is encrypted with a respective encryption key.

Statement 3. The method of statement 1 or statement 2, wherein the at least part of the respective second biometric vault is a complete respective second biometric vault.

That is, the full second biometric vault is stored within a single output of a transaction.

Statement 4. The method of any preceding statement, comprising, for each first biometric vault and for each target biometric feature, determining a plurality of respective first vectors, wherein each first vector defines the target biometric feature relative to the respective other identified biometric features, and wherein each respective first binary representation is generated based on a respective first vector.

Statement 5. The method of statement 4, wherein each respective first vector comprises a respective value for one, some or all of the relative distance, relative angle, and/or relative orientation of the target biometric feature relative to the respective other identified biometric features.

Statement 6. The method of statement 5, wherein each first binary representation is based on a respective second binary representation of the respective value of one, some or all of the relative distance, relative angle and/or relative orientation of the target biometric feature relative to the respective other identified biometric features.

Statement 7. The method of statement 4 or any statement dependent thereon, wherein for each target biometric feature, the method comprises: applying a respective first transformation to the respective values of each respective first vector, wherein the respective first transformation is configured to remove correlations between the target biometric feature and the respective other identified biometric features, and wherein the respective first binary representation is based on the transformed respective values.

Statement 8. The method of statement 7, wherein for each target biometric feature, the respective first transformation is configured to remove said correlations by transforming the distance and/or angle of the respective target biometric feature relative to the respective other identified biometric features.

Statement 9. The method of statement 8, wherein the relative distance of the respective target biometric feature is transformed as a function of a respective co-ordinate and rotation invariant characteristic.

Statement 10. The method of statement 8 or statement 9, wherein the relative angle of the respective target biometric feature is transformed as a function of a respective pseudo-randomly generated transformation value.

Statement 11. The method of any preceding statement, wherein for each first biometric vault, at least some of the first binary values are respective mock binary representations of respective mock biometric features, wherein a mock biometric feature is a feature that is not present in the biometric reading, and wherein the respective second binary value paired with the respective mock binary representation are respective mock binary values.

A mock binary value does not reveal information for reconstructing the first-level secret value. Moreover, a mock binary value, if used when attempting to reconstruct the first-level secret value, would result in an incorrect first-level secret value.

Statement 12. The method of statement 11, comprising, for each first biometric vault, determining a respective second vector for each of the respective mock biometric features such that a respective minimum distance between each of the respective first vectors and each of the respective second vectors is above a predetermined threshold, and wherein the respective second binary representations are generated based on a respective second vector.

Statement 13. The method of statement 11 or statement 12, wherein for each first biometric vault, a total number of mock biometric features is greater than a total number of biometric features.

Statement 14. The method of any preceding statement, wherein for each first biometric vault, the first-level secret value is a pseudorandomly generated value.

Statement 15. The method of any preceding statement, comprising, for each first biometric vault: splitting the respective first-level secret value into at least the first threshold number of elements, and wherein the first-level secret value is encoded into a respective first polynomial function, wherein the coefficients of the respective first polynomial function are respective ones of the threshold number of elements, and wherein the respective second binary values that are paired to the respective first binary representations are generated by evaluating the first polynomial function using the respective first binary representation.

The first-level secret value can be reconstructed via polynomial interpolation using the threshold number of second binary values that are paired with first binary representations.

Statement 16. The method of any preceding statement, comprising generating a plurality of first biometric vaults.

Statement 17. The method of statement 16 when dependent on statement 7, wherein a different first transformation is applied to generate at least one of the plurality of biometric vaults.

Statement 18. The method of statement 16 or any statement dependent thereon, wherein a second threshold number of the first-level secret values are required to generate a second-level secret value.

The second-level secret value can be reconstructed via polynomial interpolation using the threshold number of first-level secret values.

Statement 19. The method of statement 18, wherein the second-level secret value is a pseudo-randomly generated value.

Statement 20. The method of statement 18 or statement 19, comprising: splitting the respective second-level secret value into at least the second threshold number of elements, and wherein the second-level secret value is encoded into a second polynomial function, wherein the coefficients of the second polynomial function are respective ones of the second threshold number of elements, and wherein the second-level secret value can be reconstructed by evaluating the second polynomial function at each respective first-level secret value.

Statement 21. The method of any preceding statement, comprising generating one or more private keys based on the first-level secret value.

The one or more private keys may form part of a hierarchical deterministic key structure.

Statement 22. The method of statement 18 or any statement dependent thereon, comprising generating one or more private keys based on the second-level secret value.

The one or more private keys may form part of a hierarchical deterministic key structure.

Statement 23. The method of any preceding statement, wherein each of the one or more blockchain transactions comprises a respective first spendable output, and wherein the method comprises revoking at least part of a respective second biometric vault included within a respective blockchain transaction by spending the respective spendable output.

Statement 24. The method of any preceding statement, comprising, for each first biometric vault: obtaining a respective master private key; and generating one or more auxiliary private keys based on the respective master private key.

Statement 25. The method of statement 24 when dependent on statement 2, wherein a first one of the one or more auxiliary keys is used as the respective encryption key.

Statement 26. The method of statement 23 or statement 24, when dependent on statement 10, wherein a second one of the one or more auxiliary keys is the transformation value.

Statement 27. The method of any of statements 24 to 26, when dependent on statement 23, wherein each respective spendable output is locked to a respective public key corresponding to a respective one of the one or more auxiliary keys.

Statement 28. The method of any of statements 24 to 27, wherein the respective master private key and the respective one or more auxiliary keys form part of a respective hierarchical deterministic key structure.

Statement 29. The method of statement 26, comprising: generating a second value based on each of the transformation values; evaluating a third polynomial function at the second value to generate a third value, wherein the coefficients of the second polynomial function are pseudo-randomly generated; and wherein each second biometric vault comprises the second polynomial evaluated at the respective first-level secret value and the third value.

Statement 30. The method of any preceding statement, wherein the at least one biometric reading comprises at least one of:

a fingerprint reading,
an iris reading,
a finger-vein pattern reading,
a wrist-vein pattern reading,
a skin-structure pattern, and/or
a facial pattern.

Statement 31. A computer-implemented method of unlocking one or more biometric vaults of a biometric vault system, wherein the biometric vault system is generated according to the method of any of statement 1 to 30, and wherein the method comprises: obtaining at least one candidate biometric reading; identifying a plurality of biometric features from the at least one biometric reading; generating a plurality of respective candidate binary representations of respective ones of the plurality of biometric features; obtaining, from the blockchain, one or more second biometric vaults, each second biometric vault comprising a respective first biometric vault, and wherein each first biometric vault comprises a plurality of respective first binary values paired with a respective second binary value; and for each first biometric vault: determining at least a threshold number of respective first binary values that correspond to respective ones of the plurality of candidate binary representations, obtaining a threshold number of the second binary values that are paired with respective ones of a first threshold number of first binary representations, and reconstructing a first-level secret value based on each of the first threshold number of the second binary values.

Statement 32. The method of statement 1, comprising: performing said determining, obtaining and reconstructing for at least a second threshold number of different first biometric vaults to reconstruct the second threshold number of first-level secret values; and reconstructing a second-level secret value based on the second threshold number of first-level secret values.

Statement 33. The method of statement 31 or statement 32, comprising generating one or more private keys based on the first-level secret value, and/or generating one or more private keys based on the second-level secret value.

In some embodiments, one of the generated private keys may be a master private key, and wherein the method may comprise generating one or more private keys of a hierarchical deterministic key structure.

The method may comprise using at least one of the generated private keys to generate a signature based on a message.

The message may comprise at least part of a blockchain transaction.

The method may comprise generating a respective public key corresponding to a respective one of the generated private keys, and using the respective public key to encrypt data within a blockchain transaction.

In some embodiments, said obtaining of the one or more biometric readings may comprise obtaining multiple biometric readings.

In some embodiments, each of the multiple biometric readings may be a biometric reading from a same user. In other embodiments, at least two of the multiple biometric readings may be a respective biometric reading from a different respective user.

When biometric readings from two users are used to generate the seed (a shared seed), the shared seed may be used to generate one or more shared private keys, e.g. a shared HD key structure. The seed generated based on the biometric reading(s) from one user may be used to generate a master private key of a HD key structure, and the seed generated based on the biometric reading(s) from a different user may be used to generate a chain code for the keys of the HD key structure.

Statement 34. Computer equipment comprising: memory comprising one or more memory units; and processing apparatus comprising one or more processing units, wherein the memory stores code arranged to run on the processing apparatus, the code being configured so as when on the processing apparatus to perform the method of any of statements 1 to 33.

Statement 35. A computer program embodied on computer-readable storage and configured so as, when run on one or more processors, to perform the method of any of statements 1 to 33.

The invention claimed is:

1. A computer-implemented method of storing a biometric vault system on a blockchain, wherein the biometric vault system comprises one or more biometric vaults, each biometric vault locking a respective secret value, and wherein the method comprises:

obtaining at least one biometric reading;

identifying a plurality of biometric features from the at least one biometric reading;

for each one of one or more respective target ones of the plurality of biometric features:

generating a plurality of first binary values, at least one of which is a respective first binary representation of the target biometric feature relative to respective other ones of the identified biometric features;

generating, for each one of the plurality of first binary values, a second binary value, thus generating a plurality of second binary values, of which at least one is required to reconstruct a respective first-level secret value;

generating a plurality of binary data pairs, each data pair comprising one of the plurality of first binary values and the corresponding one of the plurality of second binary values;

generating a first biometric vault comprising the plurality of binary data pairs;

generating a second biometric vault comprising the first biometric vault;

generating a blockchain transaction comprising a respective output comprising at least part of the second biometric vault; and transmitting the one or more respective blockchain transactions corresponding to the one or more respective target biometric features to the blockchain.

2. The method of claim 1, wherein the at least part of the respective second biometric vault is encrypted with a respective encryption key.

3. The method of claim 1, comprising, for each first biometric vault and for each target biometric feature, determining a plurality of respective first vectors, wherein each first vector defines the target biometric feature relative to the respective other identified biometric features, and wherein each respective first binary representation is generated based on a respective first vector.

4. The method of claim 3, wherein each respective first vector comprises a respective value for one, some or all of a relative distance, relative angle, and/or relative orientation of the target biometric feature relative to the respective other identified biometric features.

5. The method of claim 4, wherein each first binary representation is based on a respective second binary representation of the respective value of one, some or all of the relative distance, relative angle and/or relative orientation of the target biometric feature relative to the respective other identified biometric features.

6. The method of claim 3, wherein for each target biometric feature, the method comprises: applying a respective first transformation to the respective values of each respective first vector, wherein the respective first transformation is configured to remove any correlations that exist between the target biometric feature and the respective other identified biometric features, and wherein the respective first binary representation is based on the transformed respective values.

7. The method of claim 6, wherein for each target biometric feature, the respective first transformation is configured to remove said correlations by transforming a relative distance and/or angle of the respective target biometric feature relative to the respective other identified biometric features.

8. The method of claim 7, wherein the relative distance of the respective target biometric feature is transformed as a function of a respective co-ordinate and rotation invariant characteristic.

9. The method of claim 7, wherein the relative angle of the respective target biometric feature is transformed as a function of a respective transformation value, wherein the respective transformation value is pseudorandomly generated.

10. The method of claim 9, comprising, for each first biometric vault, determining a respective second vector for each of the respective mock biometric features such that a respective minimum distance between each of the respective first vectors and each of the respective second vectors is above a predetermined threshold, and wherein the respective second binary representations are generated based on a respective second vector.

11. The method of claim 1, wherein for each first biometric vault, at least one of the first binary values are respective mock binary representations of respective mock biometric features, wherein a mock biometric feature is a feature that is not present in the biometric reading, and wherein the respective second binary value paired with the respective mock binary representation are respective mock binary values.

12. The method of claim 11, wherein for each first biometric vault, a total number of mock biometric features is greater than a total number of biometric features.

13. The method of claim 1, comprising, for each first biometric vault:

splitting the respective first-level secret value into at least a first threshold number of elements, and wherein the first-level secret value is encoded into a respective first polynomial function, wherein coefficients of the respective first polynomial function are respective ones of the threshold number of elements, and wherein the respective second binary values that are paired to the respective first binary representations are generated by evaluating the first polynomial function using the respective first binary representation.

14. The method of claim 1, comprising generating one or more private keys based on the first-level secret value.

15. The method of claim 1, wherein each of the one or more blockchain transactions comprises a respective first spendable output, and wherein the method comprises spending the respective spendable output, wherein said spending revokes at least part of a respective second biometric vault included within a respective blockchain transaction.

16. The method of claim 1, comprising, for each first biometric vault:

obtaining a respective master private key; and generating one or more auxiliary private keys based on the respective master private key.

17. The method of claim 16, wherein the at least part of the respective second biometric vault is encrypted with a respective encryption key, and wherein a first one of the one or more auxiliary keys is used as the respective encryption key.

18. A computer-implemented method of unlocking one or more biometric vaults of a biometric vault system that includes one or more biometric vaults, each biometric vault locking a respective secret value, wherein the biometric vault system is generated by:

obtaining at least one biometric reading;

identifying a plurality of biometric features from the at least one biometric reading;

for each one of one or more respective target ones of the plurality of biometric features:

generating a plurality of first binary values, at least one of which is a respective first binary representation of the target biometric feature relative to respective other ones of the identified biometric features;

generating, for each one of the plurality of first binary values, a second binary value, thus generating a plurality of second binary values, of which at least one is required to reconstruct a respective first-level secret value;

generating a plurality of binary data pairs, each data pair comprising one of the plurality of first binary values and the corresponding one of the plurality of second binary values;

generating a first biometric vault comprising the plurality of binary data pairs;

generating a blockchain transaction comprising a respective output comprising at least part of the second biometric vault; and transmitting the one or more respective blockchain transactions corresponding to the one or more respective target biometric features to the blockchain, and wherein the method comprises:

obtaining at least one candidate biometric reading;

identifying a second plurality of biometric features from the at least one candidate biometric reading;

generating a plurality of respective candidate binary representations of respective ones of the second plurality of biometric features;

obtaining, from the blockchain, one or more second biometric vaults, each second biometric vault comprising a respective first biometric vault, and wherein each first biometric vault comprises a plurality of respective first binary values paired with a respective second binary value; and for each first biometric vault:

determining at least a threshold number of respective first binary values that correspond to respective ones of the plurality of candidate binary representations, obtaining a threshold number of the second binary values that are paired with respective ones of a first threshold number of first binary representations, and reconstructing a first-level secret value based on each of the first threshold number of the second binary values.

19. Computer equipment comprising:

memory comprising one or more memory units; and processing apparatus comprising one or more processing units, wherein the memory stores code arranged to run on the processing apparatus, the code being configured so as when run on the processing apparatus, the processing apparatus performs a method of storing a biometric vault system on a blockchain, wherein the biometric vault system comprises one or more biometric vaults, each biometric vault locking a respective secret value, and wherein the method comprises:

obtaining at least one biometric reading;

identifying a plurality of biometric features from the at least one biometric reading;

for each one of one or more respective target ones of the plurality of biometric features:

generating a plurality of first binary values, at least one of which is a respective first binary representation of the target biometric feature relative to respective other ones of the identified biometric features;

generating, for each one of the plurality of first binary values, a second binary value, thus generating a plurality of second binary values, of which at least one is required to reconstruct a respective first-level secret value;

generating a plurality of binary data pairs, each data pair comprising one of the plurality of first binary values and the corresponding one of the plurality of second binary values;

generating a first biometric vault comprising the plurality of binary data pairs;

generating a blockchain transaction comprising a respective output comprising at least part of the second biometric vault; and transmitting the one or more respective blockchain transactions corresponding to the one or more respective target biometric features to the blockchain.

20. A computer program embodied on a non-transitory computer-readable storage and configured so as, when run on one or more processors, the one or more processors perform a method of storing a biometric vault system on a blockchain, wherein the biometric vault system comprises one or more biometric vaults, each biometric vault locking a respective secret value, and wherein the method comprises:

obtaining at least one biometric reading;

identifying a plurality of biometric features from the at least one biometric reading;

for each one of one or more respective target ones of the plurality of biometric features:

generating a plurality of first binary values, at least one of which is a respective first binary representation of the target biometric feature relative to respective other ones of the identified biometric features;

generating, for each one of the plurality of first binary values, a second binary value, thus generating a plurality of second binary values, of which at least one is required to reconstruct a respective first-level secret value;

generating a plurality of binary data pairs, each data pair comprising one of the plurality of first binary values and the corresponding one of the plurality of second binary values;

generating a first biometric vault comprising the plurality of binary data pairs;

generating a blockchain transaction comprising a respective output comprising at least part of the second biometric vault; and transmitting the one or more respective blockchain transactions corresponding to the one or more respective target biometric features to the blockchain.

* * * * *